Sept. 20, 1927. 1,643,055
A. S. BUTELL
TRANSMISSION
Filed Dec. 31, 1925 4 Sheets-Sheet 2

Inventor
A. S. Butell.
By Lacy Lacy, Attorneys

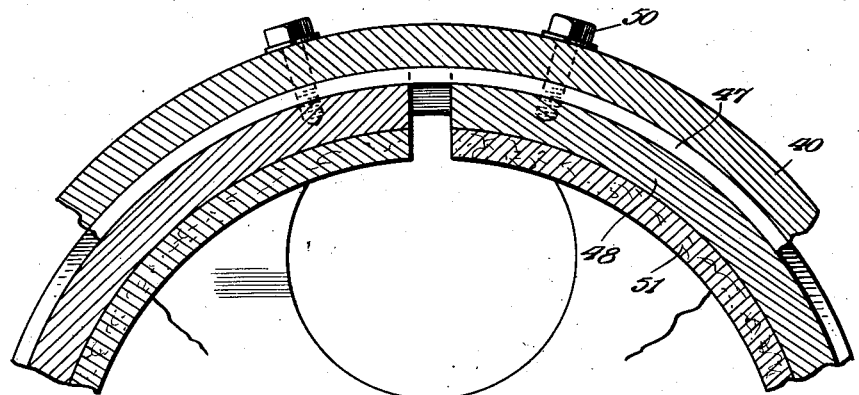
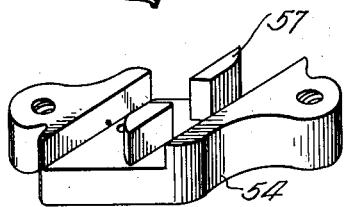
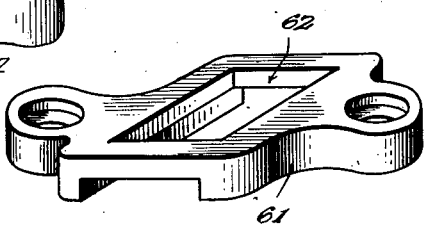
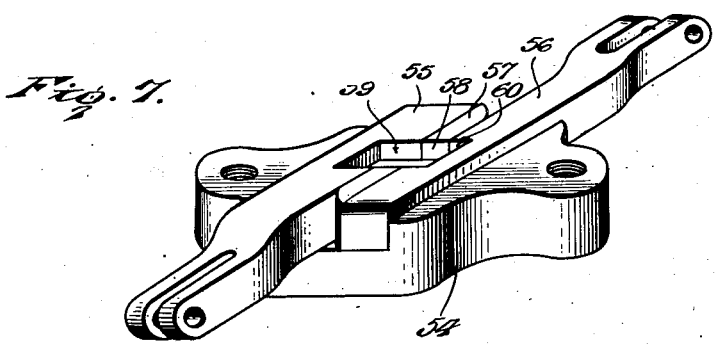

Sept. 20, 1927.
A. S. BUTELL
TRANSMISSION
Filed Dec. 31, 1925
1,643,055
4 Sheets-Sheet 4
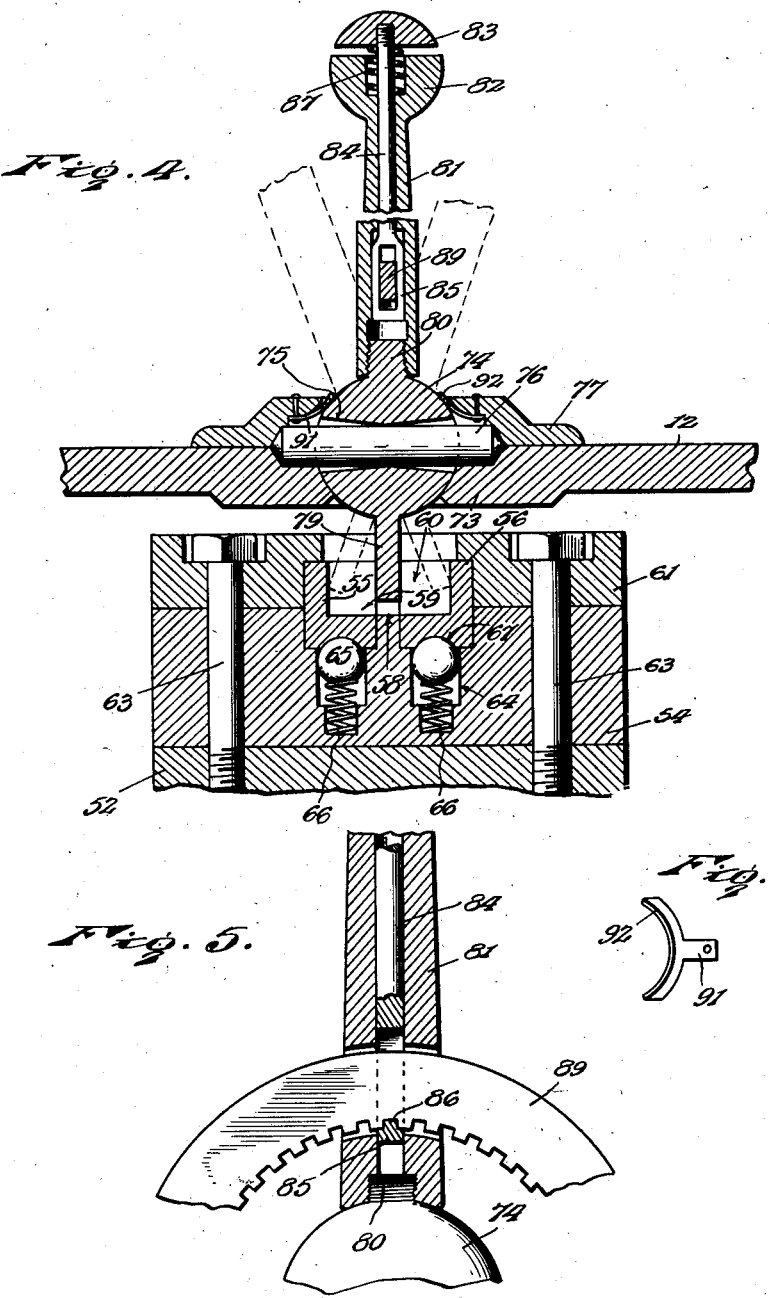
Inventor
A. S. Butell.
By Lacy & Lacy, Attorneys Patented Sept. 20, 1927.

1,643,055

UNITED STATES PATENT OFFICE.

ADOLPHUS S. BUTELL, OF KANSAS CITY, MISSOURI.

TRANSMISSION.

Application filed December 31, 1925. Serial No. 78,661.

This invention relates to an improved selective speed transmission and seeks, among other objects, to provide a transmission wherein the transmission gears will always be in mesh so that all clashing of gears, as experienced in connection with the ordinary sliding gear transmission, will be eliminated.

A further object of the invention is to provide a transmission which may be employed either with or without a power transmitting clutch, as commonly found upon motor vehicles, and wherein the transmission will embody a novel clutch mechanism for selecting the different speeds.

A still further object of the invention is to provide a transmission wherein the different speeds may be easily and quickly selected and wherein inexperience in operating the transmission to select the different speeds cannot result in injury to the mechanism.

And the invention seeks, as a still further object, to provide a transmission well adapted for general use and capable of supplanting the usual selective speed motor vehicle transmissions as now prevalently employed.

Other objects of the invention not above specifically mentioned will appear during the course of the following description.

In the accompanying drawings:

Figure 3 is an enlarged sectional view particularly showing the mounting of the movable clutch members.

Figure 4 is a vertical sectional view on line 4—4 of Figure 1.

Figure 5 is an enlarged fragmentary sectional view through the control lever at a right angle to Figure 4.

Figure 7 is a detail perspective view particularly showing the shifter bars and supporting block.

Figure 8 is a detail perspective view of the retaining plate of the shifter bars.

Figure 9 is a plan view of one of the tensioning springs for the control lever.

Figure 10 is a perspective view of the guide block.

Figure 1:
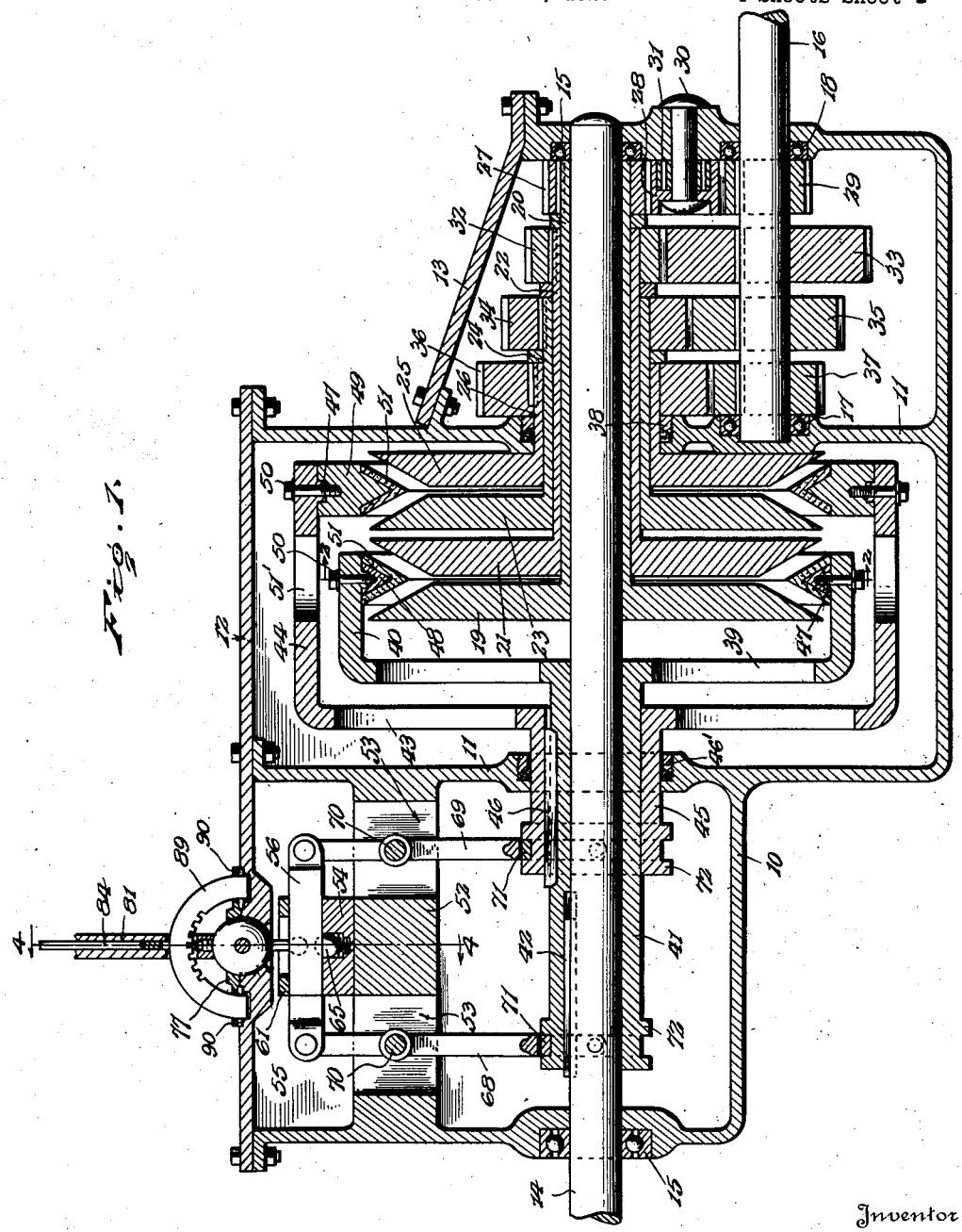
Figure 1 is a vertical longitudinal sectional view through my improved transmission.

In carrying the invention into effect, I employ a casing 10, and extending transversely of the casing are spaced parallel partitions 11 dividing the casing into front, intermediate and rear chambers. The front chamber lies flush at its upper end with the upper end of the intermediate chamber while the rear chamber lies flush at its lower end with the lower end of the intermediate chamber, and closing the front and intermediate chambers is a cover plate 12 preferably bolted in position. Closing the rear chamber is a cover plate 13 also preferably bolted in position.

Journaled through the casing from front to rear thereof is a drive shaft 14 rotatably supported by bearings 15 in the front and rear end walls of the casing, and extending rearwardly from the casing is a driven shaft 16 rotatably supported at its forward end by a bearing 17 upon the partition 11 while a similar bearing 18 journals the shaft at the rear end wall of the casing. Rotatable upon the drive shaft 14 within the intermediate chamber of the casing is a relatively fixed clutch member or disc 19 having a sleeve 20 rotatably fitting the shaft and extending into the rear chamber of the casing. Rotatable upon the sleeve 20 is a second like clutch member 21 having a sleeve 22 rotatably fitting the sleeve 20 but of less length. Rotatable upon the sleeve 22 is a third similar clutch member 23 having a sleeve 24 rotatably fitting the sleeve 22 but of less length, and rotatable upon the sleeve 24 is a fourth similar clutch member 25 having a shorter sleeve 26 rotatably fitting the sleeve 24. The pair of clutch members 19 and 21 has oppositely beveled peripheral edges as does also the pair of clutch members 23 and 25, and while, in the present instance, I have shown the use of clutch members of conical formation, still it is contemplated that the exact shape of the clutch members may be changed if so desired.

Fixed to the rear end of the sleeve 20 of the clutch member 19 is a reverse gear 27 meshing with a gear 28 which, in turn, meshes with a gear 29 fixed on the shaft 16. The gear 28 is supported by a pin 30 which extends through the rear end wall of the casing, and mounted upon said pin is a bearing 31 journaling the gear. Fixed to the rear end of the sleeve 22 of the clutch member 21 is a low speed gear 32 meshing with a gear 33 fixed on the shaft 16, and fixed on the rear end of the sleeve 24 of the clutch member 23 is a second speed gear 34 meshing with a gear 35 fixed on the shaft 16. Fixed on the rear end of the sleeve 26 of the clutch member 25 is a high speed gear 36 meshing with a gear 37 fixed on the shaft 16. All of these gears are constantly in mesh and mounted upon the partition 11 to snugly surround the sleeve 26 of the clutch member 25 is a gland 38.

Figure 2:
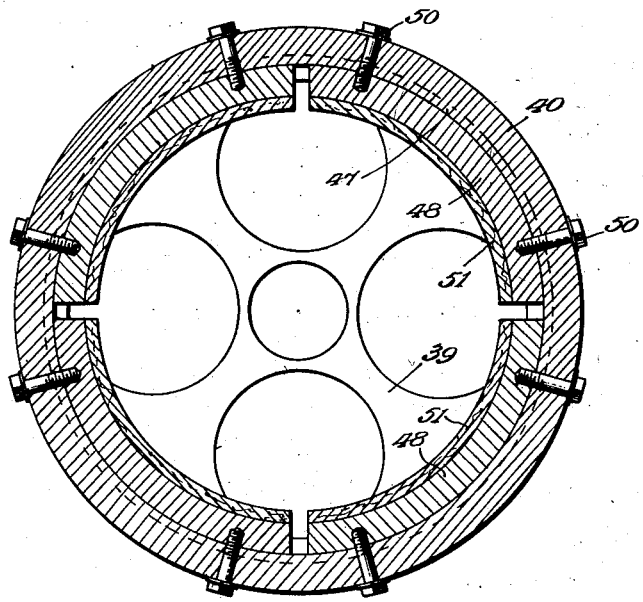
Figure 2 is a transverse sectional view on the line 2—2 of Figure 1, looking in the direction indicated by the arrows.

Slidably mounted upon the drive shaft 14 within the intermediate chamber of the casing is a spider 39 having a rearwardly directed cylindrical shell 40 surrounding the clutch members 19 and 21, and projecting forwardly from the spider into the front chamber of the casing is a sleeve 41 fitting the shaft. This sleeve is splined upon the shaft by suitably spaced keys 42. Slidable upon the sleeve 41 of the spider 39 is a somewhat larger spider 43 having a cylindrical shell 44 freely surrounding the shell 40 of the former spider to overhang the clutch members 23 and 25, and formed on the spider 43 is a forwardly directed sleeve 45 which projects into the front chamber of the casing but is shorter than the sleeve 41. The sleeve 45 slidably fits the sleeve 41, being splined thereon by suitably spaced keys 46, and snugly surrounding said sleeve is a gland 46' on the partition 11. Formed on the shells 40 and 44 of the spiders near their rear ends are internal annular flanges 47, and grooved at their outer peripheries to snugly fit over said flanges are sectional clutch members or rings 48 and 49 anchored by suitably spaced radial cap bolts 50 extending through the shells. These clutch members are V-shaped in cross section at their inner peripheries, and fitting the V-shaped inner edges of said members are yieldable V-shaped friction facings 51 to coact with the beveled edges of the clutch members 19, 21, 23 and 25. The facings may be of leather or other approved material and are secured to the clutch members in any approved manner. As shown in Figure 2, each of the clutch members 48 and 49 is preferably composed of four segmental sections spaced apart at their ends so that by displacing the bolts 50, said sections may be removed for renewing the facings 51 and, as brought out in Figure 1, the shell 44 of the spider 43 is provided with one or more openings 51' through which the securing bolts 50 on the shell 40 of the spider 39 may be reached.

Extending horizontally within the front chamber of the casing 10 is a cross bar 52 in which are formed spaced slots 53. The cross bar is integral with the front end wall of the casing and with the partition 11, and resting upon said bar between the slots 53 is a guide block 54. As seen in Figures 4 and 7 of the drawings, the block is slotted at its upper side to slidably receive a pair of oppositely directed shifter bars 55 and 56, and projecting between said bars is a separator 57 integral with the block. The separator 57 is provided with a notch 58 while the bars 55 and 56 are provided with notches 59 and 60 normally registering with the notch 58. Fitting over the bars is a cap plate 61 mating with the block 54. As seen in Figures 4 and 8, the cap plate is recessed to slidably accommodate the bars, and formed in said plate is a medial oblong opening 62. The block and plate are provided with registering ears and extending through said ears are cap bolts 63 which are screwed into the cross bar 52 for rigidly connecting said block and plate with the bar. Thus, the shifter bars 55 and 56 are slidably confined between the plate 61 and the block, and formed in the block beneath said bars, as shown in Figure 4, are recesses 64 freely accommodating ball detents 65. Disposed beneath said detents are springs 66 pressing the detents upwardly, and formed in the shifter bars are sockets 67 to accommodate said detents so that the detents will thus function to normally lock the shifter bars in neutral position. Freely accommodated by the slots 53 of the cross bar 52 are shifter forks 68 and 69 pivoted upon pins 70 which extend through the cross bar at the slots. At their upper ends, these forks are pivotally connected with the ends of the shifter bars 55 and 56, and pivotally engaged with the lower ends of the forks are substantially semi-circular yokes 71 freely confined between pairs of annular flanges 72 on the forward ends of the sleeves 41 and 45 of the spiders 39 and 43.

Figure 6:
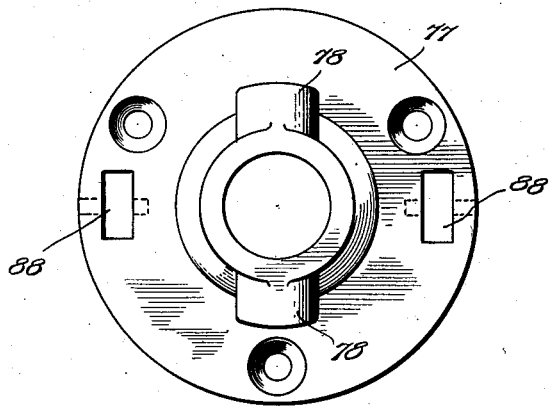
Figure 6 is a plan view of the ball retaining cap of the control lever.

Formed on the cover plate 12 above the cap plate 61 is a ball socket 73 in which is mounted the ball 74 of a control lever, said ball being provided with a double conic opening 75 therethrough, and extending through said opening is a pivot pin 76 freely fitting the opening at its smallest diameter. Thus, the ball may be rocked laterally in opposite directions upon the pin and may also be rocked forwardly and rearwardly. The cover plate is provided with recesses to accommodate the ends of the pin, and fitting over the ball is a cap plate 77 which, as seen in Figures 4 and 6, is provided with alined housings 78 enclosing the ends of the pin. The cap plate is bolted or otherwise secured to the cover plate so that the pivot pin is thus confined between said plates while, at the same time, the ball may be freely rocked on said pin. Formed on the ball at its lower side is a short arm 79 which projects through the opening 62 of the cap plate 61 for coaction with the shifter bars 55 and 56, and upstanding from the ball at its upper side is an alined stud 80.

Screwed over said stud is the stem 81 of the control lever. This stem is provided at its upper end with a spherical knob comprising a section 82 integral with the stem and a somewhat smaller section 83 movable relative to the former section. Slidable through the stem is a latch rod 84 upon the upper end of which the section 83 of the knob is screwed, and formed on said rod at its lower end is a yoke 85 which is provided, as shown in Figure 5, with a tooth 86. Interposed between the sections 82 and 83 of the knob of the lever is a spring 87 which is accommodated in a suitable recess in the former section and acts against the latter section for pressing the latch rod upwardly. Formed in the cap plate 77 at the front and rear of the ball 74 are transversely elongated openings 88, and freely accommodated at its ends by said openings to extend at right angles to the pin 76, is a segment 89 which is freely received through the stem 81 of the control lever and through the yoke 85 of the latch rod 84. Confined between the cover plate 12 and cap plate 77, as seen in Figure 1, are pivot pins 90 which lie in a plane with the pin 76 and swingingly mount the segment at its ends. Thus, when the control lever is rocked laterally, the segment will swing therewith and said segment is, as shown in Figure 5, provided at its lower edge with teeth for engagement by the tooth 86 of the yoke of the latch rod so that, as will be perceived, the rod will normally coact with the segment for locking the lever against forward and rearward movement. Freely received in suitable recesses in the cap plate 77, as shown in Figure 4, are tensioning springs 91, one of which is shown in detail in Figure 9. The stems of these springs are riveted or otherwise secured to the cap plate and formed on said stems are segmental friction members 92 fitting the ball 74 at opposite sides thereof to yieldably bear against the ball. Thus, the springs will normally hold the control lever in vertical neutral position.

As will now be seen, by rocking the stem 81 of the control lever laterally in one direction, as shown in dotted lines in Figure 4, the arm 79 of the ball 74 of said lever may be moved into the recess 59 of the shifter bar 55 when, by pressing downwardly on the knob section 83 of said lever to disengage the latch rod 84 from the segment 89, the lever may be swung forwardly. Forward movement of the lever will, as will be appreciated, impart rearward movement to the shifter bar 55, with the result that the fork 68 will be rocked to draw the spider 39 forwardly and shift the clutch member 48 into engagement with the clutch member 19. Thus, since said spider rotates with the shaft 14, the clutch member 19 will be driven for rotating the reverse gear 27 so that the shaft 16 will be counter-rotated. After the control lever has been swung forwardly the proper distance to tightly bind the clutch member 48 against the clutch member 19, the latch rod 84 is released, when the spring 87 will immediately function to retract the rod so that the tooth 86 of the rod will be engaged with the segment 89 for locking the lever and consequently locking the former clutch member in engagement with the latter clutch member. By swinging the control lever rearwardly, the clutch member 48 may, as will be perceived, be moved into engagement with the clutch member 21 and locked in engagement therewith for driving the low speed gear 32, when the shaft 16 will be rotated at low speed. Similarly, by rocking the control lever laterally in the opposite direction to dispose the arm 79 of the ball 74 in the recess 60 of the shifter bar 56, the control lever may then be swung forwardly to coact with said shifter bar for drawing the spider 43 forwardly and shifting the clutch member 49 into engagement with the clutch member 23. The latch rod 84 may then be released for locking the lever, when the second speed gear 34 will be driven for rotating the shaft 16 at second speed. On the contrary, by rocking the control lever rearwardly, the clutch member 49 may be locked in engagement with the clutch member 25 for driving the high speed gear 36, when the shaft 16 will be rotated at high speed. Thus, as will be seen, the control lever may be manipulated for selecting the different speed gears and since the power is transmitted through the clutch members while the speed gears are constantly in mesh, clashing of the gears is effectually avoided while the mechanism will also be protected by said clutch members against sudden strain and consequent injury.

Having thus described the invention, what I claim is:

1. A selective speed transmission including a drive shaft, a driven shaft having speed gears thereon, clutch members free on the drive shaft and provided with speed gears meshing with said first mentioned gears, said members being provided with annular beveled edges, spiders splined on the drive shaft and provided with concentrically arranged shells encircling said members, clutch members fixed to said shells and V-shaped in cross section at their inner edge to coact with the beveled edges of said members, the outermost shell having openings therein to permit access to the clutch member of the innermost shell, and means for shifting the spiders to selectively engage the latter clutch member with said first mentioned clutch members.

2. A selective speed transmission including a drive shaft, a driven shaft having speed gears thereon, clutch members free on the drive shaft and provided with speed gears meshing with said first mentioned gears, a spider splined on the drive shaft and provided with a shell surrounding said members, said shell being formed with an internal flange, a clutch member grooved to fit over said flange, means connecting the latter member with said shell, and means for shifting the spider to selectively engage the latter clutch member with said first mentioned clutch members.

In testimony whereof I affix my signature.

ADOLPHUS S. BUTELL. [L. s.]